United States Patent

Hayashida et al.

[11] 3,897,755
[45] Aug. 5, 1975

[54] EXHAUST GAS RE-CIRCULATING TYPE ROTARY PISTON ENGINE

[75] Inventors: Motoyuki Hayashida; Kuniyuki Toyama; Masanori Kurokawa, all of Hiroshima, Japan

[73] Assignee: Toyo Kogyo Company Limited, Hiroshima, Japan

[22] Filed: May 9, 1973

[21] Appl. No.: 358,569

[30] Foreign Application Priority Data
May 26, 1972 Japan................................ 47-62610

[52] U.S. Cl............................. 123/8.13; 123/8.45
[51] Int. Cl............................................. F02b 53/04
[58] Field of Search................. 123/8.13, 8.01, 8.45

[56] References Cited
UNITED STATES PATENTS

| | | | |
|---|---|---|---|
| 3,682,151 | 8/1972 | Tatsutomi | 123/8.01 |
| 3,783,839 | 1/1974 | Shimizu | 60/278 |
| 3,795,228 | 3/1974 | Shimizu | 123/8.01 |

*Primary Examiner*—William L. Freeh
*Assistant Examiner*—O. T. Sessions
*Attorney, Agent, or Firm*—Sughrue, Rothwell, Mion, Zinn and Macpeak

[57] ABSTRACT

A rotary piston engine having a blind recess of a given length and width in the trochoidal inner peripheral wall of a casing of said engine, said recess being disposed therein in the vicinity of the minor axis of the trochoid of said casing but in the circumferential range of the trochoid between a position where one of the apex seals of the rotary piston has just passed by an exhaust port and a position of that apex seal when said rotary piston is about to open the suction opening in the casing to the working space trailing that apex seal by the rotation of the rotary piston, whereby said recess may bring an exhaust space or chamber into communication with a suction space or chamber of said engine to introduce part of the exhaust gas into said suction space.

This arrangement permits effective elimination of the objectionable components contained in the exhaust gas without impairing the output characteristics of an engine.

2 Claims, 2 Drawing Figures

PATENTED AUG 5 1975　　　　　　　　　　　　　　　3,897,755

EXHAUST GAS RE-CIRCULATING TYPE ROTARY PISTON ENGINE

BACKGROUND OF THE INVENTION

1. Field of the Invention

This invention relates to a rotary piston engine of an exhaust gas re-circulating type and more particularly to improvements in a device for eliminating the objectionable components contained in the exhaust gas from the engine.

2. Description of the Prior Art

Hitherto, many methods and devices have been proposed to reduce in amount the objectional components such as nitric oxides ($NO_x$), hydrocarbon (HC), carbon monoxide (CO), etc., contained in the exhaust gas from the engine.

Most effective among those is a method of re-introducing part of the exhaust gas from the exhaust space, into the suction space of the engine. However, such method and devices have suffered from many shortcomings such as lowered output characteristics of the engine and undesirable fuel consumption.

Other attempts are a method using an exhaust gas treating device in which catalysts are contained and the one adopting the fuel injection system. More importantly, the aforesaid methods and devices can not avoid the use of a complicated construction and hence result in greater weight and higher production cost of the engine.

Accordingly, it remains desirable to provide a rotary piston engine which can reduce, in amount, the objectionable components contained in the exhaust gas, by using device of a simple construction.

It is an object of the invention to provide a rotary piston engine which can reduce in amount the objectionable gas contained in the exhaust gas from the engine by re-introducing part of said exhaust gas from the exhaust space, into a section space of the engine.

It is a further object of the invention to provide a rotary piston engine of the type specified, which is particularly directed to the reduction, in amount, of the nitric oxides ($NO_x$) rather than the other components such as HC, CO, etc..

The term " space " as used herein is meant the so called variable working chamber of the rotary piston engine.

SUMMARY OF THE INVENTION

It has now been found that the foregoing and related objects can readily be achieved in a rotary piston engine which comprises a blind recess of a given length and width in the trochoidal inner peripheral wall of a casing, said recess being disposed in the vicinity of the minor axis of the trochoid of said casing, yet in the circumferential range thereof between a position of one of the apices of the rotor when that apex has just passed by an exhaust port and a position of that apex when the rotor is about to communicate the working space which is finished exhausting gas with the suction opening by rotation of the rotary piston. With this arrangement, there can be achieved the reintroduction of the exhaust gas into the suction space with an advantage of a simple construction, thereby permitting the elimination of the objectionable components contained in the exhaust gas without lowering the output of the engine.

DESCRIPTION OF THE PREFERRED EMBODIMENTS

Figure 2:
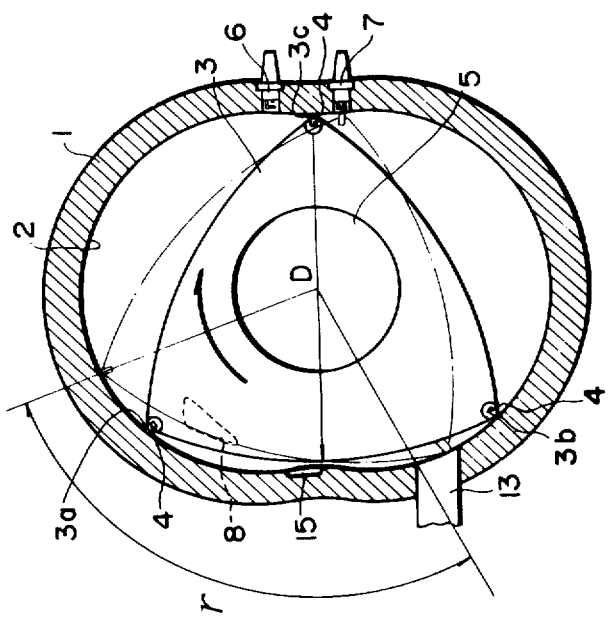
FIG. 2 is an enlarged view of one embodiment of the rotary piston engine of the present invention.
Figure 1:
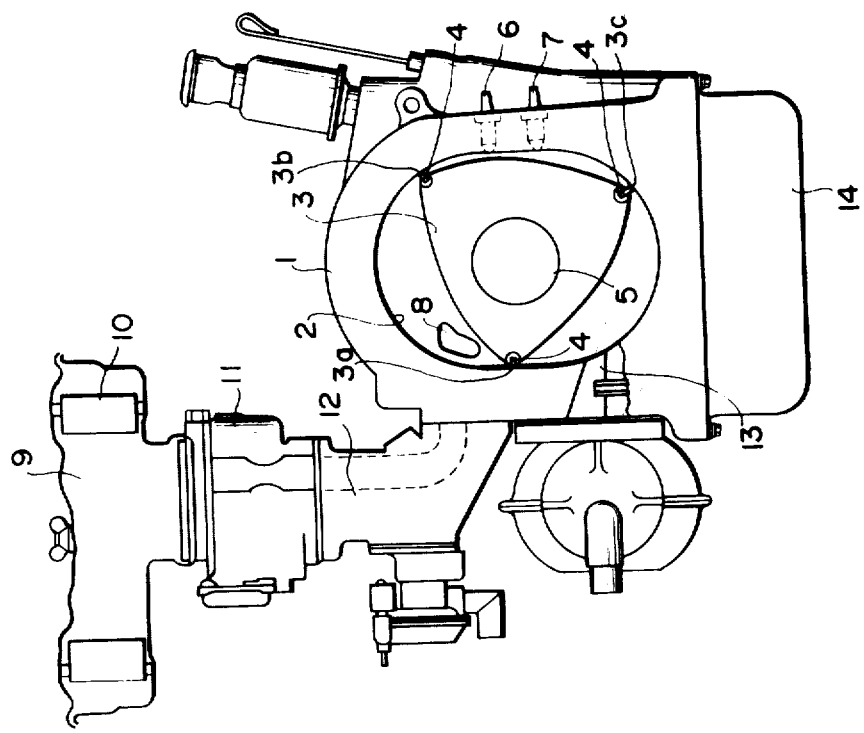
FIG. 1 is a view, partly shown in cross section, of the construction of a conventional rotary piston engine.

Referring now to FIG. 1, there is shown the construction of a rotary piston engine with accessaries attached thereto. Shown at 1 is a casing of the conventional rotary piston engine, the inner peripheral wall 2 of which is formed to a trochoidal shape. A rotary piston 3, which is formed by the inner envelope of said trochoid, is adapted to accomplish the epicyclic rotational movement with the apexes $3a$, $3b$ and $3c$ thereof in sliding contact with the inner peripheral wall of the casing, for the cycle of the suction of the fuel-air mixture gas, compression, explosion, expansion and exhausting thereof. Fitted in said apexes are apex seals 4 to effect the gas-tight sealing between the rotary piston 3 and wall 2, the seals 4 dividing the space within said casing 1 into three working spaces. The rotation of the rotary piston 3 is converted into mechanical work by way of an eccentric shaft 5 ( an output shaft). Shown at 6 and 7 are a trailing ignition plug and a leading ignition plug respectively which are both provided in the peripheral wall of the trochoid of the casing ahead of and at the rear of the minor axis of said trochoid for effecting the ignition of the fuel mixture. Designated at 8 is a suction opening which is open to the suction space or suction working chamber. The air passes through an air cleaner element 10 housed in an air cleaner 9 and then is mixed with the fuel in a carburetor 11, past a suction manifold 12 and introduced into the suction space through said suction opening. Shown at 13 is an exhaust port which is open to the exhaust space or exhaust working chamber and at 14 an oil pan. In FIG. 2, there is provided a blind recess 15 in the inner peripheral wall 2 of the trochoid of the casing 1 in the vicinity of the minor axis of said trochoid, said recesses being disposed in circumferential range r of the trochoid between a position where one of the apex seals 4 of the rotary piston has just passed by the exhaust port 13 and the position of that apex seal in the advancing direction of rotation where the rotary piston is about to open the suction opening 8 in the casing to the working chamber which is in the process of exhausting gas. As shown in FIG. 2, the recess has a predetermined length and width and may be positioned at any position in said range. However, the length and the width of the recess 15 as well as the position thereof are predetermined in accordance with the characteristics of the engine. The detailed description of the length, width and position of the recess will now be given hereinafter.

In operation, since the recess 15 is provided in the inner peripheral wall of the casing as has been described thus far, part of the combustion gas in the exhaust space or working chamber is introduced into the suction space, because the pressure in the exhaust space is higher than in the suction space, while such introduction will be continued until the pressures in both spaces become equalized. The mixture thus prepared follows the pattern of cycle described. The position of the recess with respect to the range ($r$) of the inner peripheral wall 2 governs the characteristics of the combustion gas flow into the suction space. For instance, in the case of the recess 15 being provided in the close vicinity of the exhaust port 13, the combustion gas being introduced can be well mixed with the fresh fuel mixture, since the combustion gas under high pressure in the exhaust space is in communication with the suction space. Alternatively, in the case of the recess 15 being provided in the close vicinity of the suction opening 8, there results little or no introduction of the combustion gas in the process of the suction, immediately before the suction opening has been closed. This will not impair suction efficiency of the fresh fuel mixture, nor reduce the output of the engine, while permitting the reduction, in amount, of the nitric oxides. In the actual application, there is provided a recess 15 in the vicinity of the minor axis D, as shown in FIG. 2. Thus, the position of the recess 15 is predetermined according to the characteristics of the engine. The length of the recess 15 along the circumference of the trochoid governs the duration of the flow of combustion gas being introduced, while the width and depth thereof attend to the flow rate of the combustion gas being introduced, the inclination of the recess to the rotational direction affects the mixing ratio of the combustion gas to the fresh fuel mixture, and the variation in the cross section of the recess controls the introduction rate of the combustion gas.

In the light of these factors, the recess should preferably be positioned in the close vicinity of the minor axis to compromise with the extreme characteristics of the flow of the combustion gas being introduced, in the case where the recess is provided at the both extremities of the range (r).

As is apparent from the foregoing description, the rotary piston engine according to the present invention can effectively reduce the amount of the objectionable components, particularly nitric oxides, contained in the exhaust gas from the engine, without causing lowered output of the engine.

It will be appreciated that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. In a rotary piston internal combustion engine comprising; a casing including a trochoidal inner peripheral wall, a rotary piston having at least three apices and an apex seal on each apex, means for eccentrically, rotatably mounting said rotary piston within said casing and forming between the rotary piston and the housing a plurality of working chambers performing suction, compression, explosion-expansion, and exhaust as said rotary piston rotates therein, a suction opening within the casing, and an exhaust port provided within the casing peripheral wall, the improvement comprising: a blind recess of given length and width provided within said trochoidal inner peripheral wall as a circumferential position within the range defined by the position of one of said apex seals which has just passed by said exhaust port and the position of that apex seal advanced therefrom in the direction of rotation where the chamber railing that apex seal is about to communicate with the suction opening by rotation of said rotary piston; whereby, said blind recess communicates the exhaust chamber solely to the suction chamber around each apex seal as the apex seal passes over the blind recess to effect exhaust gas re-circulation between said chambers.

2. A rotary piston engine as set forth in claim 1, wherein said blind recess is located in close vicinity to the minor axis of the trochoid of said casing.

* * * * *